(12) United States Patent
Kim

(10) Patent No.: US 10,787,123 B1
(45) Date of Patent: Sep. 29, 2020

(54) DRIVER ASSISTANCE SYSTEM, AND CONTROL METHOD FOR THE SAME

(71) Applicant: MANDO CORPORATION, Pyeongtaek-si, Gyeonggi-do (KR)

(72) Inventor: Heong Tae Kim, Yongin-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 0 days.

(21) Appl. No.: 16/707,416

(22) Filed: Dec. 9, 2019

(30) Foreign Application Priority Data

Mar. 27, 2019 (KR) .................. 10-2019-0034975

(51) Int. Cl.
*B60Q 9/00* (2006.01)
*G06K 9/00* (2006.01)
*G01S 13/931* (2020.01)

(52) U.S. Cl.
CPC .............. *B60Q 9/00* (2013.01); *G01S 13/931* (2013.01); *G06K 9/00798* (2013.01); *G06K 9/00805* (2013.01); *G01S 2013/9322* (2020.01)

(58) Field of Classification Search
CPC combination set(s) only.
See application file for complete search history.

(56) References Cited

U.S. PATENT DOCUMENTS

| 2010/0228438 | A1* | 9/2010 | Buerkle | B62D 15/025 701/41 |
| 2013/0124046 | A1* | 5/2013 | Lazic | B60K 28/066 701/42 |
| 2013/0317699 | A1* | 11/2013 | Urhahne | B62D 15/025 701/41 |
| 2015/0210273 | A1* | 7/2015 | Kaufmann | B60W 30/00 701/1 |
| 2015/0211870 | A1* | 7/2015 | Nickolaou | G01C 21/34 701/28 |
| 2016/0001781 | A1* | 1/2016 | Fung | G16H 50/20 701/36 |
| 2016/0107597 | A1* | 4/2016 | Won | G08G 1/167 340/439 |
| 2016/0167707 | A1* | 6/2016 | Lee | B62D 15/025 701/41 |

FOREIGN PATENT DOCUMENTS

JP 5622104 B2 10/2014
KR 10-2013-0068268 A 6/2013

* cited by examiner

*Primary Examiner* — Travis R Hunnings
(74) *Attorney, Agent, or Firm* — Morgan, Lewis & Bockius LLP

(57) ABSTRACT

A driver assistance system of a vehicle can adjust a warning time-point for a hands-off detector configured to detect that a hand of a driver is off of a steering wheel. To this end, the driver assistance system can include an image acquisition device configured to acquire image data of an area outside of the vehicle, a sensor configured to acquire behavior data of the vehicle, a hands-off detector configured to detect that a hand of the driver is off of the steering wheel, and a controller. The controller is configured to determine a driving situation of the vehicle based on the image data and behavior data, and to determine a warning time-point for the hands-off detector based on the driving situation. The controller can further control a warning device to output a warning message for the hands-off at the determined warning time-point.

30 Claims, 5 Drawing Sheets

[FIG. 1]
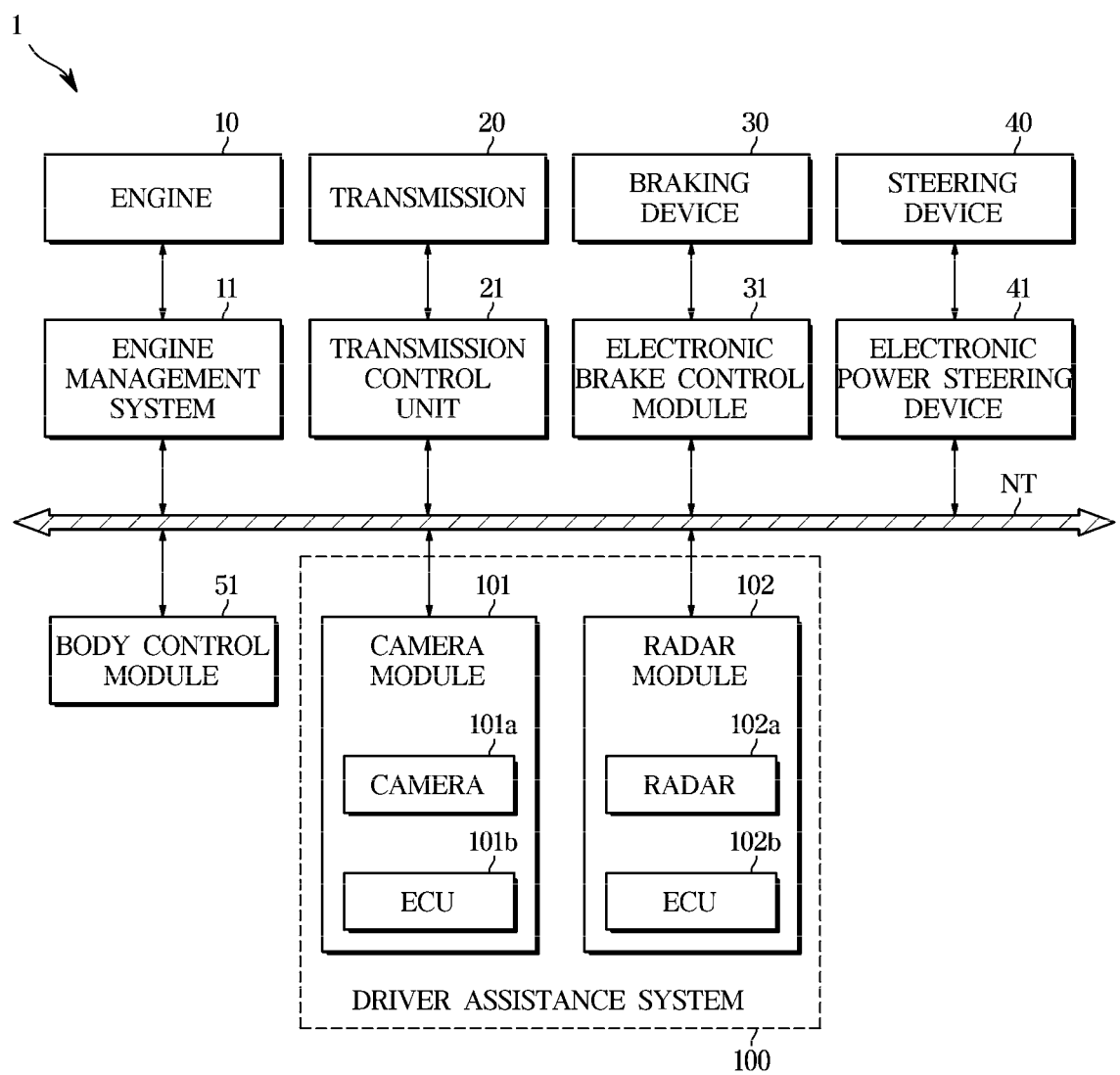

[FIG. 2]
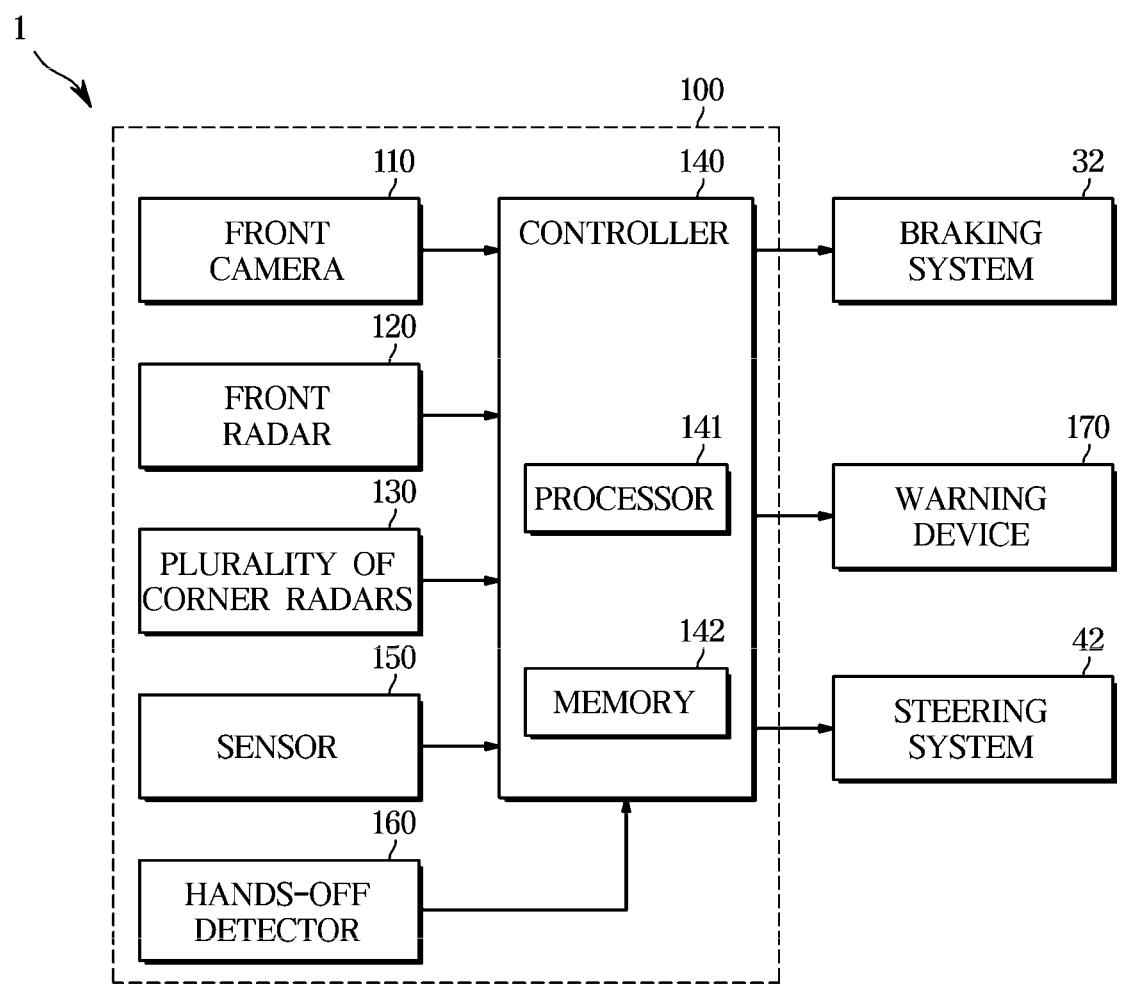

[FIG. 3]
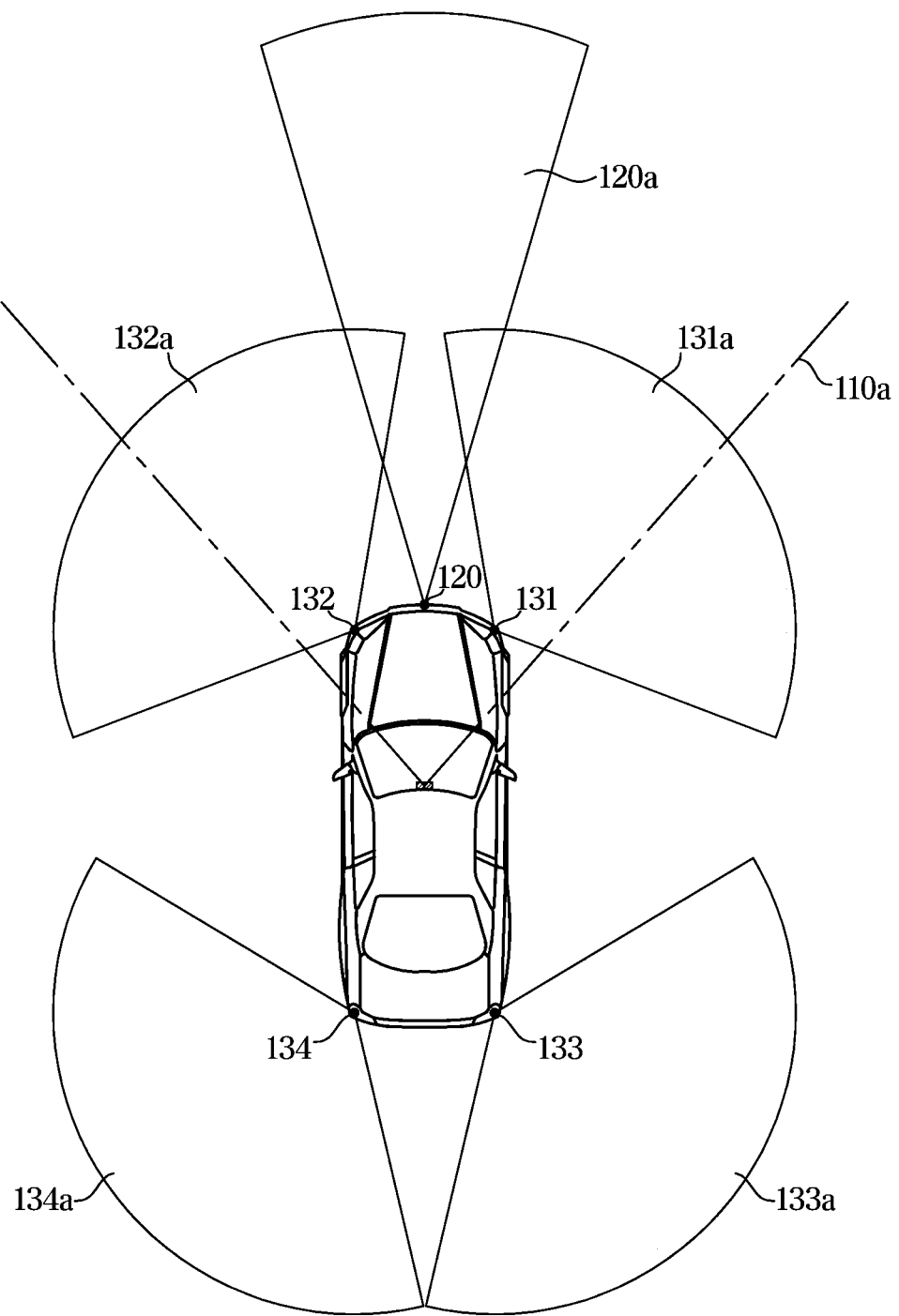

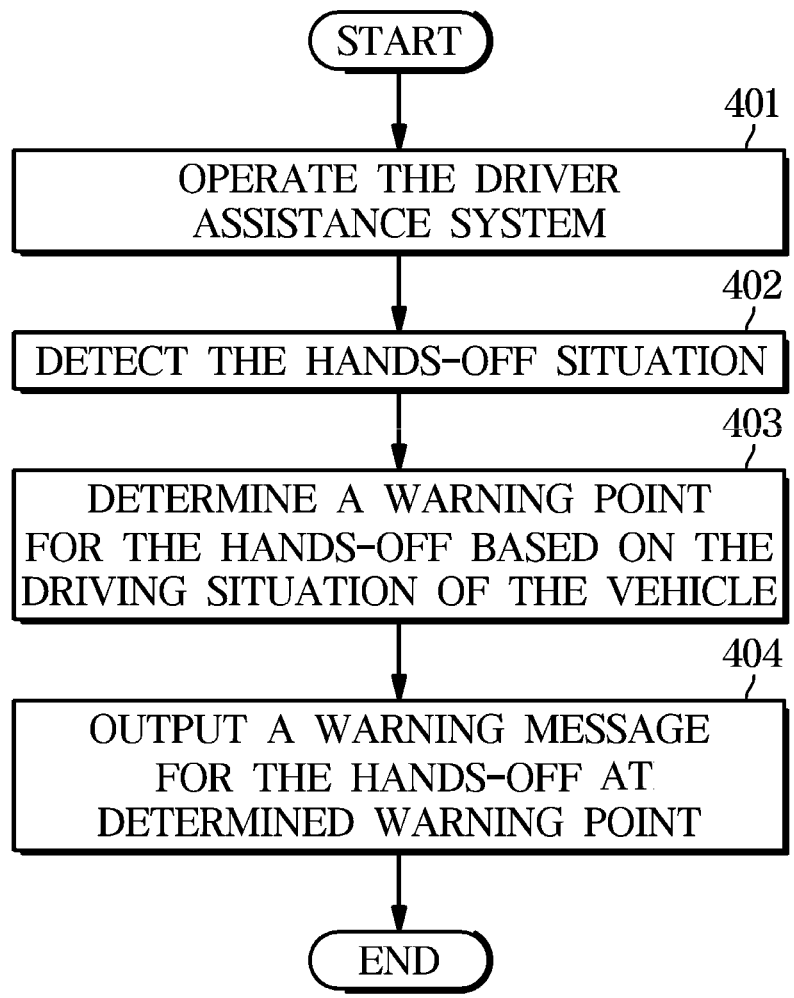

[FIG. 5]
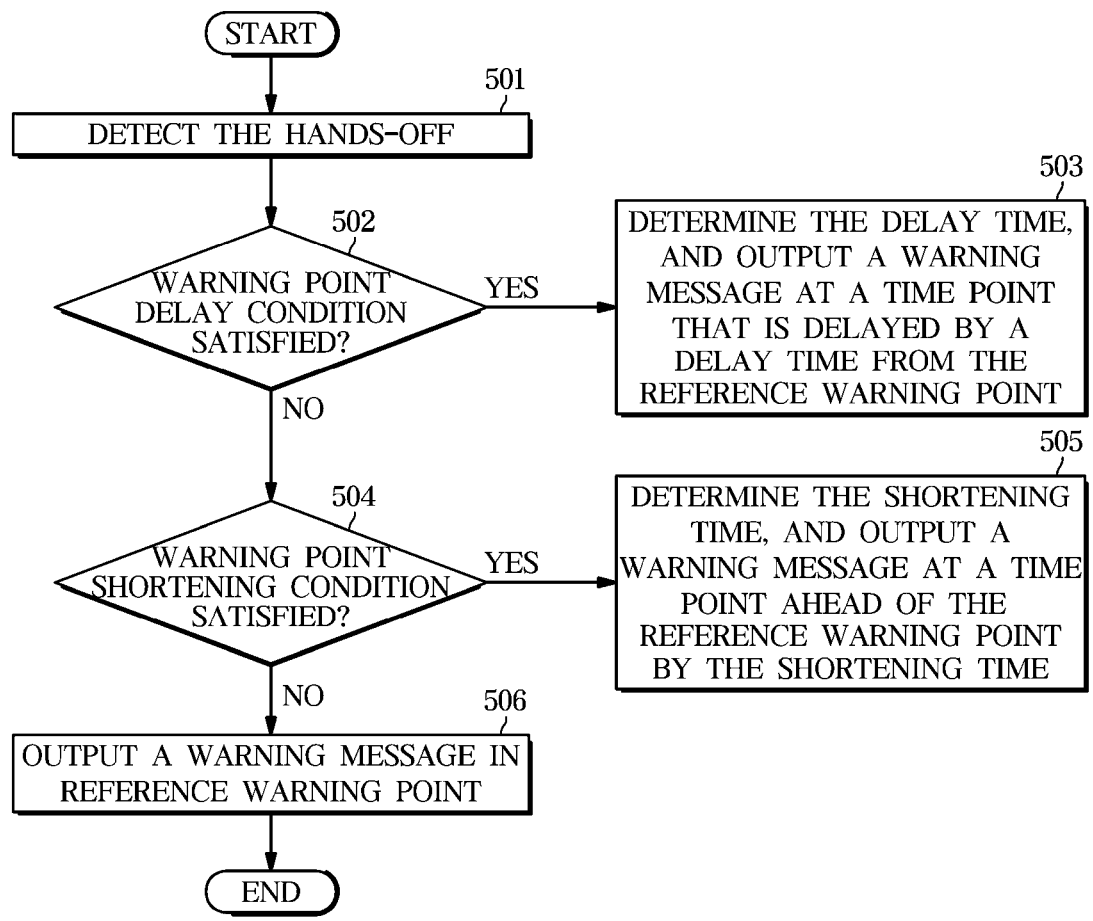

DRIVER ASSISTANCE SYSTEM, AND CONTROL METHOD FOR THE SAME

CROSS-REFERENCE TO RELATED APPLICATION

This application is based on and claims priority under 35 U.S.C. § 119 to Korean Patent Application No. 2019-0034975, filed on Mar. 27, 2019 in the Korean Intellectual Property Office, the disclosure of which is incorporated herein by reference.

BACKGROUND

1. Field

The present invention relates to a driver assistance system and a control method for the same.

2. Description of the Related Art

The Advanced Driver Assistance System (ADAS) is a system that assists the driver in driving. In particular, a steering assistance system, such as a lane keeping assist system or a lane following assist system, recognizes the lane in which the vehicle travels to maintain the vehicle in the lane without the driver's steering wheel manipulation.

However, when the driver is not touching the steering wheel, safety may be lowered. Therefore, the conventional art warns the driver at a predetermined time when a hands-off situation is sensed from the steering wheel.

However, when a warning about a hands-off occurs frequently regardless of the driving situation, the driver's satisfaction may be lowered.

SUMMARY

The present invention provides a driver assistance system and a control method for the same, which can provide a warning message for a hands-off to a driver by adjusting a warning time-point for the hands-off according to a driving situation.

As a technical means for achieving the above technical problem, a driver assistance system according to an embodiment includes an image acquisition device configured to acquire image data of an area outside of the vehicle, a sensor configured to acquire behavior data of the vehicle, a hands-off detector configured to detect that a hand of the driver is off of a steering wheel, and a controller. The controller is configured to determine a driving situation of the vehicle based on the image data acquired by the image acquisition device and the behavior data acquired by the sensor, and to control a warning time-point for the hands-off detector based on the determined driving situation.

The controller may determine whether the driving situation satisfies a warning point delay condition, may determine a delay time when the warning point delay condition is satisfied, and may control the warning time-point to be delayed by the delay time from a predetermined reference warning time-point.

When the vehicle is located within a predetermined distance from a center of a lane, a reliability of a lane is greater than a predetermined reliability, a risk of collision with an external object is less than a predetermined risk, and a curvature of a road ahead is less than a predetermined curvature, the controller may determine that the warning point delay condition is satisfied.

The controller may adjust the delay time based on at least one of a current speed and a distance to an external object.

The controller may determine whether the driving situation satisfies a warning point shortening condition, may determine a shortening time when the warning point shortening condition is satisfied, and may control the warning time-point to be ahead of a predetermined reference warning time-point by the shortening time.

In case of at least one of when the vehicle is located outside a predetermined distance from a center of a lane, when a reliability of at least one lane is less than a predetermined reliability, when a risk of collision with an external object is greater than a predetermined risk, when a curvature of the road ahead is more than a predetermined curvature, and when behavior data of the vehicle is outside a predetermined safety range, the controller may determine that the warning point shortening condition is satisfied.

The controller may determine a different shortening time for each of a plurality of warning point shortening conditions.

The driver assistance system according to an embodiment may further include a warning device for outputting a warning message, and/or a radar configured to acquire radar data about an object outside the vehicle. The controller may determine the driving situation of the vehicle based on the radar data acquired by the radar, and/or the controller may control the warning device to output a warning message for the hands-off at the determined warning time-point. The warning device may output a warning message including at least one of a text, a voice, and an image.

The behavior data may include yaw rate change amount, lateral acceleration change amount and longitudinal acceleration change amount.

According to an exemplary embodiment, a control method of a driver assistance system may include acquiring image data of an area exterior to a vehicle, acquiring behavior data of the vehicle; detecting that a hand of the driver is off of a steering wheel, and determining a driving situation of the vehicle based on the acquired image data and the acquired behavior data. A warning time-point is determined for a hands-off notification based on the determined driving situation when the hand is detected to be off of the steering wheel.

The determining of the warning time-point for the hands-off may include determining whether the driving situation satisfies a warning point delay condition, determining a delay time when the warning point delay condition is satisfied, and controlling the warning time-point to be delayed by the determined delay time from a predetermined reference warning time-point.

The determining whether the driving situation satisfies a warning point delay condition may include determining that the warning point delay condition is satisfied when the vehicle is located within a predetermined distance from a center of a lane, a reliability of a lane is greater than a predetermined reliability, a risk of collision with an external object is less than a predetermined risk, and a curvature of a road ahead is less than a predetermined curvature.

The determining a delay time may include adjusting the delay time based on at least one of a current speed and a distance to an external object.

The determining of the warning time-point for the hands-off may include determining whether the driving situation satisfies a warning point shortening condition; determining a shortening time when the warning point shortening condition is satisfied; and controlling the warning time-point to be ahead of a predetermined reference warning time-point by the shortening time.

The determining whether the driving situation satisfies a warning point shortening condition may include determining that the warning point shortening condition is satisfied in case of at least one of the vehicle is located outside a predetermined distance from a center of a lane, a reliability of at least one lane is less than a predetermined reliability, a risk of collision with an external object is greater than a predetermined risk, a curvature of the road ahead is more than a predetermined curvature, and behavior data of the vehicle is outside of a predetermined safety range.

The determining of the shortening time may include determining a different shortening time for each of a plurality of different warning time-point shortening conditions.

The control method of the driver assistance system according to an embodiment may further include outputting a warning message for the hands-off at the determined warning point.

The warning message may include at least one of a text, a voice, and an image.

The behavior data may include a yaw rate change amount, a lateral acceleration change amount and a longitudinal acceleration change amount.

According to another exemplary embodiment, a driver assistance system of a vehicle includes one or more sensors configured to acquire sensing data of an area outside of the vehicle, a hands-off detector configured to detect a hands-off condition in which a hand of a driver is off of a steering wheel of the vehicle, and a controller including at least one processor configured to process the sensing data. The controller is configured to monitor an environment surrounding the vehicle based on the acquired sensing data to determine a driving situation of the vehicle, adjust a warning time for providing a hands-off response based on the determined driving situation of the vehicle, and trigger the hands-off response after the adjusted warning time has elapsed following detection of the hands-off condition by the hands-off detector.

A vehicle may include an engine, a braking system, a steering system, and the driver assistance system.

According to a further exemplary embodiment, a method for providing a driver hands-off response includes monitoring an environment surrounding a vehicle to determine a driving situation of the vehicle, adjusting a warning time for providing a hands-off response based on the determined driving situation of the vehicle, and triggering the hands-off response after the adjusted warning time has elapsed following detection of a hands-off condition in which a hand of a driver is off of a steering wheel of the vehicle.

According to the driver assistance system of the present invention and a control method of the same, a warning message about a hands-off may be provided to a driver by adjusting a warning time-point for a hands-off according to a driving situation.

Accordingly, the driver can also increase satisfaction and can increase the reliability of autonomous driving. In addition, the safety of running can be improved.

BRIEF DESCRIPTION OF THE DRAWINGS

These and/or other aspects of the invention will become apparent and more readily appreciated from the following description of the embodiments, taken in conjunction with the accompanying drawings of which:

FIG. 1 illustrates a configuration of a vehicle according to an embodiment.

FIG. 2 illustrates a configuration of a driver assistance system according to an embodiment.

FIG. 3 illustrates sensing fields of camera(s) and radar(s) included in a driver assistance system according to an embodiment.

FIGS. 4 and 5 are flowcharts illustrating a control method of a driver assistance system according to an exemplary embodiment.

DETAILED DESCRIPTION

In the following description, like reference numerals refer to like elements throughout the specification. Well-known functions or constructions are not described in detail since they would obscure the one or more exemplary embodiments with unnecessary detail. Terms such as "unit", "module", "member", and "block" may be embodied as hardware or software. According to embodiments, a plurality of "units", "modules", "members", and "blocks" may be implemented as a single component or a single "unit", "module", "member", and "block" may include a plurality of components.

It will be understood that when an element is referred to as being "connected" to another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

It will be understood that, although the terms first, second, third, etc., may be used herein to describe various elements, the elements should not be interpreted as being limited by these terms. These terms are only used to distinguish one element from another element.

As used herein, the singular forms "a," "an," and "the" are intended to include the plural forms as well, unless the context clearly indicates otherwise.

An identification numeral or code is used for the convenience of the description but is not intended to illustrate the order of various steps. The steps may be implemented in an order different from the illustrated order unless the context clearly indicates otherwise.

Reference will now be made in detail to embodiments of the present disclosure, examples of which are illustrated in the accompanying drawings.

FIG. 1 illustrates a configuration of a vehicle according to an embodiment.

As shown in FIG. 1, the vehicle 1 includes an engine 10, a transmission 20, a braking device 30, and a steering device 40. The engine 10 includes a cylinder and a piston and may generate power for the vehicle 1 to travel. The transmission 20 includes a plurality of gears, and may transmit power generated by the engine 10 to the wheels. The braking device 30 may decelerate the vehicle 1 or stop the vehicle 1 through friction with the wheels. The steering device 40 may change the driving direction of the vehicle 1.

The vehicle 1 may comprise a plurality of electrical components. For example, the vehicle 1 includes an Engine Management System (EMS) 11, a Transmission Control Unit (TCU) 21, and an Electronic Brake Control Module 31, an Electronic Power Steering (EPS) 41, a Body Control Module (BCM) 51, and a Driver Assistance System (DAS) 100.

The engine management system 11 may control the engine 10 in response to the driver's acceleration intention through the accelerator pedal or a request from the driver assistance system 100. For example, the engine management system 11 may control the torque of the engine 10.

The transmission control unit 21 may control the transmission 20 in response to the driver's shift command through the shift lever and/or the driving speed of the vehicle 1. For example, the transmission control unit 21 can adjust the shift ratio from the engine 10 to the wheels.

The electronic brake control module 31 may control the braking device 30 in response to the driver's braking intention through the brake pedal and/or slip of the wheels. For example, the electronic brake control module 31 may temporarily release the braking of the wheel in response to the slip of the wheel sensed during braking of the vehicle 1 (e.g., as part of the operation of an Anti-lock Braking Systems, ABS). The electronic brake control module 31 may selectively release the braking of one or more selected wheels in response to oversteering and/or understeering sensed during steering of the vehicle 1 (e.g., as part of providing an Electronic stability control, ESC, capability). In addition, the electronic brake control module 31 may temporarily brake the wheels in response to slippage of the wheels sensed during driving of the vehicle 1 (Traction Control System, TCS).

The electronic power steering device 41 may assist the operation of the steering device 40 so that the driver can easily operate the steering wheel in response to the driver's steering intention through the steering wheel. For example, the electronic power steering device 41 may assist the operation of the steering device 40 to reduce the steering force provided by the driver when driving at low speeds or to increase the steering force provided by the driver when driving at high speeds.

The body control module 51 may control the operation of the electronic components that provide convenience to the driver or ensure the safety of the driver. For example, the body control module 51 may control a head lamp, a wiper, a cluster, a multifunction switch, a direction indicator lamp, and the like.

The driver assistance system 100 may assist the driver in operating (e.g., driving, braking, steering) the vehicle 1. For example, the driver assistance system 100 may detect an environment (e.g., other vehicles, pedestrians, cyclists, lanes, road signs, etc.) around the vehicle 1, and control the driving and/or braking and/or steering of the vehicle 1 in response to the sensed environment.

The driver assistance system 100 may provide various functions to the driver. For example, the driver assistance system 100 may provide Lane Departure Warning (LDW), Lane Keeping Assist (LKA), High Beam Assist (HBA), and Automatic Emergency Braking (LDB), Autonomous Emergency Braking (AEB), Traffic Sign Recognition (TSR), Smart Cruise Control (SCC), Blind Spot Detection (BSD), and the like.

The lane keeping assistance system detects the driving lane and generates the auxiliary steering torque by controlling a steering system 42 provided in the vehicle 1 so that the vehicle 1 does not depart from the driving lane.

The driver assistance system 100 includes an image acquisition device, such as camera module 101, configured to acquire image data around the vehicle 1 and a radar module 102 configured acquire object data around the vehicle 1.

The image acquisition device, such as camera module 101, may include one or more camera(s) 101*a* and a controller (Electronic Control Unit, ECU) 101*b*, and may photograph an area in front of the vehicle 1 and recognize other vehicles, pedestrians, cyclists, lanes, road signs, and the like. The image acquisition device may additionally or alternatively include one or more alternative image sensors, such as a charge-coupled device (CCD), a CMOS image sensor, or a photo sensor including photodiodes.

The radar module 102 may include a radar 102*a* and a controller 102*b*, and may acquire relative positions, relative speeds, and the like of objects (e.g., other vehicles, pedestrians, cyclists, etc.) around the vehicle 1.

The above electronic components may communicate with each other through the vehicle communication network NT. For example, the electronic components may transmit and receive data through Ethernet, Most Oriented Systems Transport (MOST), Flexray, CAN (Controller Area Network), LIN (Local Interconnect Network), etc. For example, the driver assistance system 100 may transmit a drive control signal, a braking signal, and/or a steering signal to the engine management system 11, the electronic brake control module 31, and/or the electronic power steering device 41 through the vehicle communication network NT, respectively.

FIG. 2 illustrates a configuration of a driver assistance system according to an embodiment. FIG. 3 illustrates a camera and a radar included in a driver assistance system according to an embodiment.

Referring to FIG. 2, the vehicle 1 may include a braking system 32, a steering system 42, a driver assistance system 100, and a warning device 170.

The braking system 32 may include an electronic brake control module 31 (see FIG. 1) and a braking device 30 (see FIG. 1) described with reference to FIG. 1, and the steering system 42 may include an electronic power steering device 41 (see FIG. 1) and the steering device 40 (see FIG. 1).

The driver assistance system 100 may include a camera 110, a front radar 120, a plurality of corner radars 130, a sensor 150, and a hands-off detector 160.

Referring to FIG. 3, the camera 110 may have a field of view including an area exterior to the vehicle 1, in particular a field of view 110*a* facing forward of the vehicle 10. The camera 110 may be installed in, for example, the front windshield of the vehicle 1.

The camera 110 may photograph the area in front of the vehicle 1 and acquire image data of the area in front of the vehicle 1. The image data of the area in front of the vehicle 1 may include location information about another vehicle or a pedestrian or a cyclist or a lane located in front of the vehicle 1.

The camera 110 may include a plurality of lenses and an image sensor. The image sensor may include a plurality of photodiodes for converting light into an electrical signal, and the plurality of photodiodes may be arranged in a two-dimensional matrix.

The camera 110 may be electrically connected to a controller 140. For example, the camera 110 may be connected to the controller 140 through a vehicle communication network (NT), or connected to the controller 140 through a hard wire, or connected to the controller 140 through a printed circuit board (PCB). The camera 110 may transmit image data of the area in front of the vehicle 1 to the controller 140.

Referring to FIG. 3, the front radar 120 may have a field of sensing 120*a* extending in front of the vehicle 1. The front radar 120 may be installed on, for example, a grill or bumper of the vehicle 1.

The front radar 120 may include a transmit antenna (or transmit antenna array) for radiating transmitted radio waves toward the area extending in front of the vehicle 1, and a receiving antenna (or receiving antenna array) for receiving received radio wave(s) reflected by object(s) in the area extending in front of the vehicle 1. The front radar 120 may acquire the front radar data from the transmitted radio waves transmitted by the transmitting antenna and the received radio waves received by the receiving antenna. The front radar data may include distance information and speed information about other vehicles or pedestrians or cyclists located in front of the vehicle 1. The front radar 120 may calculate the state distance to the object based on the phase difference (or time difference) between the transmitted radio wave and the received radio wave, and calculate the relative speed of the object based on the frequency difference between the transmitted radio wave and the received radio wave.

The front radar 120 may be connected to the controller 140 through, for example, a vehicle communication network NT or a hard wire or a printed circuit board. The front radar 120 may transmit the front radar data to the controller 140.

The plurality of corner radars 130 may include a first corner radar 131 installed at the front right side of the vehicle 1; a second corner radar 132 installed at the front left side of the vehicle 1; a third corner radar 133 installed at the rear right side of the vehicle 1; and a fourth corner radar 134 installed at the rear left side of the vehicle 1.

As illustrated in FIG. 3, the first corner radar 131 may have a field of sensing 131a facing the front right side of the vehicle 1 and may be installed, for example, on the right side of the front bumper of the vehicle 1. The second corner radar 132 may have a field of sensing 132a facing the front left side of the vehicle 1, and may be installed on the left side of the front bumper of the vehicle 1, for example. The third corner radar 133 may have a field of sensing 133a facing rear right of the vehicle 1, and may be installed on the right side of the rear bumper of the vehicle 1, for example. The fourth corner radar 134 may have a field of sensing 134a facing the rear left side of the vehicle 1, and may be installed at the left side of the rear bumper of the vehicle 1, for example.

Each of the first, second, third, and fourth corner radars 131, 132, 133, and 134 may include a transmitting antenna and a receiving antenna. The first, second, third and fourth corner radars 131, 132, 133, and 134 may acquire first corner radar data, second corner radar data, third corner radar data, and fourth corner radar data, respectively. The first corner radar data may include distance information and speed information about another vehicle or a pedestrian or a cyclist (hereinafter referred to as an "object") located in front of the vehicle 1 and to the right side. The second corner radar data may include distance information and speed information of an object located on the front left side of the vehicle 1. The third and fourth corner radar data may include distance information and speed information of an object located at the rear right side of the vehicle 1 and the rear left side of the vehicle 1, respectively.

Each of the first, second, third, and fourth corner radars 131, 132, 133, and 134 may be connected to the controller 140 through, for example, a vehicle communication network NT or a hard wire or a printed circuit board. The first, second, third, and fourth corner radars 131, 132, 133, and 134 may transmit the first, second, third, and fourth corner radar data to the controller 140, respectively.

Such radars may be implemented in a lidar.

Referring back to FIG. 2, the vehicle 1 may be provided with various sensor(s) 150 for acquiring behavior data of the vehicle 1. For example, the vehicle 1 may further include a speed sensor for detecting the speed of a wheel, an acceleration sensor for detecting the lateral acceleration and the longitudinal acceleration of the vehicle, a yaw rate sensor for detecting the change in the angular speed of the vehicle, and a gyro sensor for detecting the inclination of the vehicle, and a steering angle sensor for detecting a rotation and a steering angle of the steering wheel, and the like.

The behavior data may include the speed, longitudinal acceleration, lateral acceleration, steering angle, driving direction, yaw rate, inclination, and the like of the vehicle 1.

The hands-off detector 160 may detect a hands-off situation in which hands of the driver are off of (e.g., not in contact with) the steering wheel. The hands-off detector 160 may sense a hands-off situation of a driver by measuring capacitance using a conductive material provided on a steering wheel. In addition, the hands-off detector 160 may detect the hands-off of the driver using various methods. The hands-off detector 160 may determine within a short time whether the driver is holding the steering wheel with both hands, and transmit a hands-off detection signal to the controller 140.

The warning device 170 may output a warning message. For example, the warning device 170 may output a warning message about the hands-off. The warning device 170 may output a warning message including at least one of a text, a voice, an alarm, and an image. That is, the warning device 170 may include an audio device and/or a display device. The controller 140 determines a warning point for hands-off and controls the warning device 170 to output a warning message at the determined warning point. For example, the controller 140 may determine as a warning time-point for hands-off an adjustable length of a time-interval during which the hands-off condition should be maintained in order to cause output of the warning message. In the example, when the controller 140 determines that the hands-off condition has been detected continuously for the length/duration of the warning time-point, the controller may cause the warning device 170 to output the warning message after the determined warning time-point has elapsed following the initial detection of the hands-off situation.

The controller 140 may include a controller 101b (see FIG. 1) of the camera module 101 (see FIG. 1) and/or controller 102b (see FIG. 1) of the radar module 102 (see FIG. 1) and/or separate integrated controller(s).

The controller 140 includes a processor 141 and a memory 142. The controller 140 may include one or more processors 141.

The processor(s) 141 may process image data of the camera 110, front radar data of the front radar 120, corner radar data of the plurality of corner radars 130, and behavior data acquired by the sensor(s) 150, and may generate control signals for controlling the braking system 32, the steering system 42, and the warning device 170. For example, the processor 141 may include an image signal processor for processing front image data of the front camera 110; and/or a digital signal processor for processing radar data of the radars 120, 130 and behavior data acquired by the sensor(s) 150; and/or a micro control unit (Micro Control Unit, MCU) for generating a control signal.

The controller 140 may be configured to sense or identify the objects (e.g., other vehicles, pedestrians, cyclists, etc.) in front of the vehicle 1 based on the front image data of the camera 110 and the front radar data of the front radar 120.

In detail, the controller 140 may acquire location information (distance and direction) and speed information (relative speed) of objects in front of the vehicle 1 based on the front radar data of the front radar 120.

The controller 140 may acquire location information (direction) and type information (e.g., whether the object is another vehicle, a pedestrian, or a cyclist) of the objects in front of the vehicle 1 based on the front image data of the camera 110.

In addition, the controller 140 may match the objects detected by the front image data to the detected objects detected by the front radar data, and may acquire the type information, the location information, and the speed information of the objects detected in front of the vehicle 1 based on the matching result.

The controller 140 may acquire location information (distance and direction) and speed information (relative speed) of objects on the side(s) (front right, front left, rear right, rear left) of the vehicle 1 based on the corner radar data of the plurality of corner radars 130.

The memory 142 may store a program for the processor 141 to process various data and a program for the processor 141 to generate a control signal.

In addition, the memory 142 may store the image data acquired by the camera 110, the radar data acquired by the radars 120, 130, and/or the behavior data acquired by the sensor(s) 150, and may store a result of processing data by the processor(s) 141.

The memory 142 may include a nonvolatile memory such as a flash memory, a read only memory (ROM), an erasable programmable read only memory (EPROM), or the like, as well as a volatile memory such as an S-RAM or a D-RAM.

One or more processor(s) 141 included in the controller 140 may be integrated on one chip or may be physically separated. In addition, the processor(s) 141 and the memory 142 may be implemented as a single chip.

The controller 140 may identify one or more object(s) outside the vehicle 1 by processing the image data acquired by the camera 110.

In addition, the controller 140 may identify the type of the object(s). Objects outside the vehicle 1 may include lanes, curbs, guardrails, structures on roads such as median dividers, surrounding vehicles, obstacles on driving lanes, pedestrians, and the like.

The controller 140 may obtain location information of the object(s). The location information of each object may include at least one of a current location of the object, a distance to the object, a moving speed of the object, and an expected moving path of the object. The controller 140, when identifying each moving object, may detect the moving speed of the object and predict the moving path of the object based on the current position of the object and the position predicted after a predetermined time.

In addition, the controller 140 may process the image data to detect a curved section, a shoulder, a side slope of a road, and the like. The side slope of a road is a concept that includes terrain that is not continuous with the lane, such as scarps or cliffs. The controller 140 may process the image data to calculate the curvature of the road ahead.

Referring to FIGS. 4 and 5, a method of adjusting a warning point for hands-off according to driving situations will be described in detail below.

FIGS. 4 and 5 are flowcharts illustrating a control method of a driver assistance system according to an exemplary embodiment.

Referring to FIG. 4, the controller 140 may operate the driver assistance system 100 (401). For example, the controller 140 may operate a lane keeping assist system or a lane following assist system.

When operation of the driver assistance system 100 starts, the hands-off detector 160 detects (402) that the driver's hands are off of the steering wheel. The hands-off detector 160 may determine whether the driver holds the steering wheel with both hands within a short time (for example, 0.1 second) and transmit a hands-off detection signal to the controller 140 when the driver does not hold the steering wheel with both hands (e.g., when at least one hand is off of the steering wheel). Alternatively or additionally, the hands-off detector 160 may determine whether the driver holds the steering wheel with at least one hand within a short time (for example, 0.1 second) and transmit the hands-off detection signal to the controller 140 upon determining that all hand(s) of the driver are off of the steering wheel (e.g., when no hands of the driver are holding the steering wheel).

The controller 140 may process image data obtained by the camera 110, radar data obtained by radar(s) 120 and 130, and behavior data acquired by the sensor(s) 150, to determine the driving situation of the vehicle 1.

In detail, the controller 140 may detect the position of the vehicle 1 in the lane based on the image data. The controller 140 may calculate a distance by which the vehicle 1 is spaced from the center of the lane, and a distance by which the vehicle 1 is spaced from the left lane and/or the right lane.

In addition, the controller 140 may calculate the reliability of the lane based on the image data. The reliability of the lane is an indicator of the clarity of both lanes, such as the quality or reliability of sensing of the positions and other characteristics of the lanes obtained from the driver assistance system. The controller 140 may calculate the reliability of the lane by using correlation data between the degree of clarity of the lane previously stored in the memory 142 and the reliability of the lane. For example, when the lane does not exist (e.g., lane markings to not exist or are not visible), the reliability of the lane may correspond to zero, and when the lane is clearly detected above a predetermined reference clarity, the reliability of the lane may correspond to 10.

The controller 140 may calculate a collision risk with external object(s) based on the radar data. The controller 140 may calculate a time to collision (TTC), which is a time until a collision between the vehicle 1 and the front object, based on the position information (distance) and the speed information (relative speed) of the front object(s).

The controller 140 may determine the collision risk with the external object(s) based on the time to collision. For example, it may be determined that the collision risk is 30% when the time to collision is 5 seconds, and the collision risk is 80% when the time to collision is 2 seconds. Such numerical values are exemplary and the disclosure is not limited thereto.

In addition, the controller 140 may calculate a distance to collision (DTC) based on speed information (relative speed) of the front objects. The controller 140 may calculate the collision risk based on a comparison result between the distance to the collision and the distance to the front objects.

The controller 140 may process the behavior data to calculate the behavior safety of the vehicle 1. The controller 140 may determine that the behavior safety degree is low when the behavior data is out of a predetermined safety range. For example, the controller 140 may calculate a low level of the behavior safety when the yaw rate change amount, the lateral acceleration change amount, and the longitudinal acceleration change amount included in the behavior data each exceed a predetermined change amount for a predetermined time.

Correlation data between the behavior data and the behavior safety may be previously stored in the memory 142.

The controller 140 may determine the driving situation based on at least one of the position of the vehicle 1 in the lane, the reliability of the lane, the risk of collision with an external object, and the behavior safety of the vehicle 1.

The controller 140 may determine whether the driving situation satisfies a warning point delay condition under which the length/duration of the warning time-point may be extended, and determine whether the driving situation satisfies a warning point shortening condition under which the length/duration of the warning time-point may be shortened.

When the hands-off is detected by the hands-off detector 160, the controller 140 may determine or adjust a warning time-point for the hands-off based on the driving situation (403). The controller 140 may control the warning device 170 to output a warning message for hands-off at the determined or adjusted warning time-point, such as after the determined or adjusted warning time-point has elapsed following detection of the hands-off condition.

Referring to FIG. 5, the controller 140 may receive the hands-off detection signal from the hands-off detector 160 (501).

The controller 140 determines the driving situation based on at least one of the position of the vehicle 1 in the lane, the reliability of the lane, the risk of collision with an external object, and the behavior safety of the vehicle 1, and determines whether the driving situation satisfies the warning point delay condition or the warning point shortening condition (502, 504).

When the vehicle 1 is located within a predetermined distance from the center of the lane, the reliability of both lanes is greater than the predetermined reliability, the risk of collision with the external object is less than the predetermined risk, and the curvature of the road ahead is less than the predetermined curvature, the controller 140 may determine that the warning point delay condition is satisfied.

The controller 140 may determine the delay time when the warning point delay condition is satisfied. In addition, the controller 140 may adjust the delay time based on at least one of a current speed and a distance to the external object. The maximum delay time may be set to two minutes from a predetermined reference warning point. Here, the predetermined reference warning point or time-point may be defined as a time point when 12 seconds have elapsed from when the hands-off is detected, such as a time point occurring when the hands-off is maintained/detected continuously for 12 seconds. This delay time is illustrative, and this disclosure is not limited thereto.

The controller 140 may determine a time point delayed by a delay time from the predetermined reference warning point as the warning point for the hands-off, and control the warning device 170 to output a warning message after the delayed time has elapsed since the initially detected hands-off (503).

In case of at least one of when the vehicle 1 is located outside the predetermined distance from the center of the lane, when the reliability of at least one of both lanes is less than the predetermined reliability, when the risk of collision with the external object is greater than a predetermined risk, when the curvature of the road ahead is more than the predetermined curvature, and when the behavior data of the vehicle is outside the predetermined safety range, the controller 140 may determine that the warning point shortening condition is satisfied.

The controller 140 may determine a shortening time when the warning point shortening condition is satisfied. The controller 140 may determine a shortening time differently for each warning point shortening condition. That is, when the vehicle is located outside the predetermined distance from the center of the lane, when the reliability of at least one of both lanes is less than the predetermined reliability, when the risk of collision with the external object is more than the predetermined risk, when the curvature of the road ahead is greater than or equal to the predetermined curvature, and when the behavior data of the vehicle is outside the predetermined safety range, the controller 140 may determine a shortening time for each condition differently. For example, when the reference warning point is 12 seconds, in each case, the shortening time may be determined to be 9 seconds, 5 seconds, 10 seconds, 7 seconds, 11 seconds.

The controller 140 may determine a time point ahead of the predetermined reference warning point by the shortening time as a warning point for hands-off, and may control the warning device 170 to output a warning message after the shortened time has elapsed after detecting the hands-off (505).

If the driving situation does not correspond to the warning point delay condition or the warning point shortening condition, the controller 140 may control the warning device 170 to output a warning message for a hand-off at the reference warning point after detecting the hands-off (506).

As described above, according to the driver assistance system and the control method thereof, a warning message for the hands-off may be provided to the driver by adjusting the warning point for the hands-off according to the driving situation.

That is, even when the hands-off is detected, if the driving situation is a safe situation, the warning point for the hands-off may be suspended, thereby reducing the fatigue that the driver may feel due to the warning.

On the contrary, when the driving situation where the hands-off is detected is an unstable situation, the safety can be increased by shortening the warning point for the hands-off.

Therefore, the driver can also increase satisfaction and can increase the reliability of autonomous driving. In addition, the safety of driving can be improved.

The present disclosure as described above may be implemented as computer-readable codes in a non-transitory recording medium on which a program is recorded which, when executed by a processor, cause the processor to perform functions including functions described as performed herein by the controller 140 and other components of the driver assistance system 100. The computer-readable mediums include all types of recording devices which may be read by a computer system and on which data are stored.

Examples of the computer-readable medium include a Hard Disk Drive (HDD), a Solid State Disk (SSD), Silicon Disk Drive (SDD), a Read Only Memory (ROM), a Random Access Memory (RAM), CD-ROM, a magnetic tape, a floppy disk, and an optical data storage device, and may also include things implemented in the form of carrier wave (e.g. transmission through the Internet).

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiments.

What is claimed is:

1. A driver assistance system of a vehicle comprising:
an image acquisition device configured to acquire image data of an area outside of the vehicle;
a sensor configured to acquire behavior data of the vehicle;
a hands-off detector configured to detect that a hand of a driver is off of a steering wheel; and
a controller configured to:
determine a driving situation of the vehicle based on the image data acquired by the image acquisition device and the behavior data acquired by the sensor, and
control a warning time-point for the hands-off detector to be before or after a predetermined reference warning time-point by an adjustment time that is based on the determined driving situation satisfying a warning point adjustment condition,
wherein the controller determines a different adjustment time for each of a plurality of warning point adjustment conditions.

2. The driver assistance system of claim 1, wherein the controller determines whether the driving situation satisfies a warning point delay condition, determines the adjustment time as a delay time when the warning point delay condition is satisfied, and controls the warning time-point to be delayed by the delay time from a predetermined reference warning time-point.

3. The driver assistance system of claim 2, wherein when the vehicle is located within a predetermined distance from a center of a lane, a reliability of a lane is greater than a predetermined reliability, a risk of collision with an external object is less than a predetermined risk, and a curvature of a road ahead is less than a predetermined curvature, the controller determines that the warning point delay condition is satisfied.

4. The driver assistance system of claim 2, wherein the controller adjusts the delay time based on at least one of a current speed and a distance to an external object.

5. The driver assistance system of claim 1, wherein the controller determines whether the driving situation satisfies a warning point shortening condition, determines the adjustment time as a shortening time when the warning point shortening condition is satisfied, and controls the warning time-point to be ahead of a predetermined reference warning time-point by the shortening time.

6. The driver assistance system of claim 5, wherein in case of at least one of when the vehicle is located outside a predetermined distance from a center of a lane, when a reliability of at least one lane is less than a predetermined reliability, when a risk of collision with an external object is greater than a predetermined risk, when a curvature of the road ahead is more than a predetermined curvature, and when behavior data of the vehicle is outside a predetermined safety range, the controller determines that the warning point shortening condition is satisfied.

7. The driver assistance system of claim 5, wherein the controller determines a different shortening time for each of a plurality of warning point shortening conditions.

8. The driver assistance system of claim 1, further comprising:
a warning device for outputting a warning message, and
a radar configured to acquire radar data about an object outside the vehicle,
wherein the controller determines the driving situation of the vehicle based on the radar data acquired by the radar, and
the controller controls the warning device to output a warning message for the hands-off at the determined warning time-point.

9. The driver assistance system of claim 1, wherein the behavior data includes yaw rate change amount, lateral acceleration change amount and longitudinal acceleration change amount.

10. A control method of a driver assistance system comprising:
acquiring image data of an area exterior to a vehicle;
acquiring behavior data of the vehicle;
detecting that a hand of a driver is off of a steering wheel;
determining a driving situation of the vehicle based on the acquired image data and the acquired behavior data; and
controlling a warning time-point for a hands-off notification to be before or after a predetermined reference warning time-point by an adjustment time when the hand is detected to be off of the steering wheel,
wherein the adjustment time is based on the determined driving situation satisfying a warning point adjustment condition, and the controller determines a different adjustment time for each of a plurality of warning point adjustment conditions.

11. The control method of a driver assistance system of claim 10, wherein the determining of the warning time-point for the hands-off includes:
determining whether the driving situation satisfies a warning point delay condition;
determining a delay time when the warning point delay condition is satisfied; and
controlling the warning time-point to be delayed by the determined delay time from a predetermined reference warning time-point.

12. The control method of a driver assistance system of claim 11, wherein the determining whether the driving situation satisfies a warning point delay condition includes:
determining that the warning point delay condition is satisfied when the vehicle is located within a predetermined distance from a center of a lane, a reliability of a lane is greater than a predetermined reliability, a risk of collision with an external object is less than a predetermined risk, and a curvature of a road ahead is less than a predetermined curvature.

13. The control method of a driver assistance system of claim 11, wherein the determining a delay time includes:
adjusting the delay time based on at least one of a current speed and a distance to an external object.

14. The control method of a driver assistance system of claim 10, wherein the determining of the warning time-point for the hands-off includes:
determining whether the driving situation satisfies a warning point shortening condition;
determining a shortening time when the warning point shortening condition is satisfied; and
controlling the warning time-point to be ahead of a predetermined reference warning time-point by the shortening time.

15. The control method of a driver assistance system of claim 14, wherein the determining whether the driving situation satisfies a warning point shortening condition includes:
determining that the warning point shortening condition is satisfied in case of at least one of the vehicle is located outside a predetermined distance from a center of a lane, a reliability of at least one lane is less than a predetermined reliability, a risk of collision with an external object is greater than a predetermined risk, a curvature of the road ahead is more than a predetermined curvature, and behavior data of the vehicle is outside a predetermined safety range.

16. A driver assistance system of a vehicle comprising:
one or more sensors configured to acquire sensing data of an area outside of the vehicle;
a hands-off detector configured to detect a hands-off condition in which a hand of a driver is off of a steering wheel of the vehicle; and
a controller comprising at least one processor configured to process the sensing data and configured to:
monitor an environment surrounding the vehicle based on the acquired sensing data to determine a driving situation of the vehicle;
adjust a warning time for providing a hands-off response based on the determined driving situation of the vehicle by adjusting the warning time to a different value for each of a plurality of different driving situations of the vehicle; and
trigger the hands-off response after the adjusted warning time has elapsed following detection of the hands-off condition by the hands-off detector such that the hands-off response is triggered after elapsing of a different value of the warning time depending on which of the different driving situations of the vehicle has been determined.

17. The driver assistance system of claim 16, wherein the controller triggers the hands-off response by triggering a driver alert after the adjusted warning time has elapsed following detection of the hands-off condition.

18. The driver assistance system of claim 16, wherein the controller adjusts the warning time for providing the hands-off response based on at least one of a current speed of the vehicle and a distance from the vehicle to an external object.

19. The driver assistance system of claim 16, wherein the controller adjusts the warning time for providing the hands-off response by shortening the warning time relative to a predetermined reference warning time.

20. The driver assistance system of claim 19, wherein the controller shortens the warning time relative to the predetermined reference warning time in response to at least one of determining that the vehicle is located outside a predetermined distance from a center of a lane, determining a reliability of at least one lane is less than a predetermined reliability, determining a risk of collision with an external object is greater than a predetermined risk, determining a curvature of the road ahead is more than a predetermined curvature, and determining behavior data of the vehicle is outside a predetermined safety range.

21. The driver assistance system of claim 16, wherein the controller adjusts the warning time for providing the hands-off response by lengthening the warning time relative to a predetermined reference warning time.

22. The driver assistance system of claim 21, wherein the controller lengthens the warning time relative to the predetermined reference warning time in response to at least one of determining that the vehicle is located within a predetermined distance from a center of a lane, determining that a reliability of a lane is greater than a predetermined reliability, determining that a risk of collision with an external object is less than a predetermined risk, and determining that a curvature of a road ahead is less than a predetermined curvature.

23. A vehicle comprising:
an engine, a braking system, and a steering system; and
the driver assistance system of claim 16.

24. A method for providing a driver hands-off response comprising:
monitoring an environment surrounding a vehicle to determine a driving situation of the vehicle;
adjusting a warning time for providing a hands-off response based on the determined driving situation of the vehicle by adjusting the warning time to a different value for each of a plurality of different driving situations of the vehicle; and
triggering the hands-off response after the adjusted warning time has elapsed following detection of a hands-off condition in which a hand of a driver is off of a steering wheel of the vehicle such that the hands-off response is triggered after elapsing of a different value of the warning time depending on which of the different driving situations of the vehicle has been determined.

25. The method of claim 24, wherein the triggering the hands-off response comprises triggering a driver alert after the adjusted warning time has elapsed following detection of the hands-off condition.

26. The method of claim 24, wherein the adjusting comprises shortening the warning time for providing the hands-off response relative to a predetermined reference warning time.

27. The method of claim 26, wherein the warning time is shortened relative to the predetermined reference warning time in response to at least one of determining that the vehicle is located outside a predetermined distance from a center of a lane, determining a reliability of at least one lane is less than a predetermined reliability, determining a risk of collision with an external object is greater than a predetermined risk, determining a curvature of the road ahead is more than a predetermined curvature, and determining behavior data of the vehicle is outside a predetermined safety range.

28. The method of claim 24, wherein the adjusting comprises lengthening the warning time for providing the hands-off response relative to a predetermined reference warning time.

29. The method of claim 28, wherein the warning time is lengthened relative to the predetermined reference warning time in response to at least one of determining that the vehicle is located within a predetermined distance from a center of a lane, determining that a reliability of a lane is greater than a predetermined reliability, determining that a risk of collision with an external object is less than a predetermined risk, and determining that a curvature of a road ahead is less than a predetermined curvature.

30. A non-transitory computer-readable medium storing computer-executable instructions which, when executed by a processor, causes the processor to perform the method of claim 24.

* * * * *